US008423567B1

(12) United States Patent
Finneran et al.

(10) Patent No.: US 8,423,567 B1
(45) Date of Patent: Apr. 16, 2013

(54) DYNAMIC QUERY DATA VISUALIZER

(75) Inventors: Paul Finneran, Galway (IE); Oliver Weiser, Galway (IE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/428,362

(22) Filed: Mar. 23, 2012

(51) Int. Cl.
*G06F 17/30* (2006.01)

(52) U.S. Cl.
USPC .......................... 707/759; 707/756; 707/766

(58) Field of Classification Search .................. 707/718, 707/759, 765, 766
See application file for complete search history.

(56) References Cited

U.S. PATENT DOCUMENTS

| 5,608,899 | A  | * | 3/1997 | Li et al. ................................. 1/1 |
| 6,353,830 | B1 | * | 3/2002 | Yee et al. ............................... 1/1 |
| 7,979,424 | B2 | * | 7/2011 | Dettinger et al. ............. 707/718 |
| 2008/0177719 | A1 | * | 7/2008 | Dettinger et al. ................. 707/4 |
| 2008/0195930 | A1 | * | 8/2008 | Tolle ............................. 715/227 |
| 2008/0319942 | A1 | * | 12/2008 | Courdy et al. .................... 707/3 |
| 2009/0193047 | A1 | * | 7/2009 | Chen et al. ..................... 707/102 |
| 2011/0307504 | A1 | * | 12/2011 | Agrawal et al. ............... 707/766 |
| 2012/0054216 | A1 | * | 3/2012 | Haahr et al. .................. 707/765 |

OTHER PUBLICATIONS

Nigel R. Shadbolt et al., Nitlelight: A Graphical Tool for Semantic Query Constructoin (2008).*

* cited by examiner

*Primary Examiner* — Hosain Alam
*Assistant Examiner* — Ahmed Abraham
(74) *Attorney, Agent, or Firm* — Kenyon & Kenyon LLP

(57) ABSTRACT

Fields in a query result of a query may be classified as numerical, date, or text according to their field type. Depending on the classification of the fields, different fields or functions applied to the fields may added to first dimension, second dimension, and/or filter menus in an interface. A user may make a selection of fields and/or functions from the menus, and additional query terms may be generated and appended to the query. The appended query may then be executed and the results may be displayed in a first and a second dimension of the interface depending on the selections made by the user.

20 Claims, 4 Drawing Sheets

DYNAMIC QUERY DATA VISUALIZER

BACKGROUND

Many organizations use business management software to manage core business functions including, for example, financials, sales, customer relationship management, inventory, and operations. Users of the business management software often run reports or otherwise extract data from the software application for different business purposes such as setting targets, measuring performance, and forecasting future events. These reports and data extractions are generated based on data included in a business management system.

These queries, however, may be static queries that are configured and then executed. The data satisfying the query criteria is then typically represented in a grid or static chart. If the user wants to change an aspect of the query or the data included in the query, the user must return to the query designer to change the query, after which time the query is re-run, and the grid or static chart is recreated. This process is cumbersome and inefficient as the user must switch to and from the query designer to change the query and have the query re-executed.

There is a need for additional functionality in business management systems that enables users to restructure query results and change the output format of query results in real time without having to switch program components to change the original query.

DETAILED DESCRIPTION

One or more modules may provide an interface and tools for dynamically generating additional query terms that may be appended to existing queries in a business management system and change visual output format of query results in real time. The modules may be included as a stand-alone component that may be added onto an existing business management system to provide this added functionality. The modules may also include tools enabling the module to read queries from the business management system and then append additional terms to the read query without actually changing the query in the business management system. The queries that included the appended terms may then be executed and the results may be outputted.

The modules may also include an interface, such as a graphical user interface, providing several options for a user to select different criteria and options for additional terms appended to the original query without requiring the user to re-program or re-write the query in a particular query programming language. Thus, for example, a user may be able to generate an appended query in an Structured Query Language (SQL) by selecting different criteria and options without having to know the semantics and syntax of SQL.

The interface may also include an output display area for displaying a result or output of an executed query. In some instances, the output display area may include the ability to display the raw query results in a table format in which one or more fields of the query results may be displayed in the interface. The output display area may also display a chart, graph, or other visual representation of the query results.

The interface may also include different menus having different options for selecting the data that is to be displayed in the output display area. These menus may include a filter menu, a first dimension menu, and a second dimension menu. The filter menu may include a list of fields that may be restricted to a particular value or range of values. Selecting one or more of these fields may provide the user with an opportunity to select the value or range of values to which the results of the query displayed in the output display area are to be restricted.

The first dimension menu may include a list of fields that may be shown on a first dimension of a chart, graph, grid, or other visual representation of the query results in the output display area. The second dimension menu may include a list of functions applied to the query results that may be shown on a second dimension of the chart, graph, grid, or other visual representation of the query results in the output display area. In some instances, the first and second dimensions may be either horizontal or vertical dimensions. For example, if the first dimension corresponds to a horizontal axis of a graph, then the second dimension may correspond to a vertical axis, and vice versa.

Figure 1:
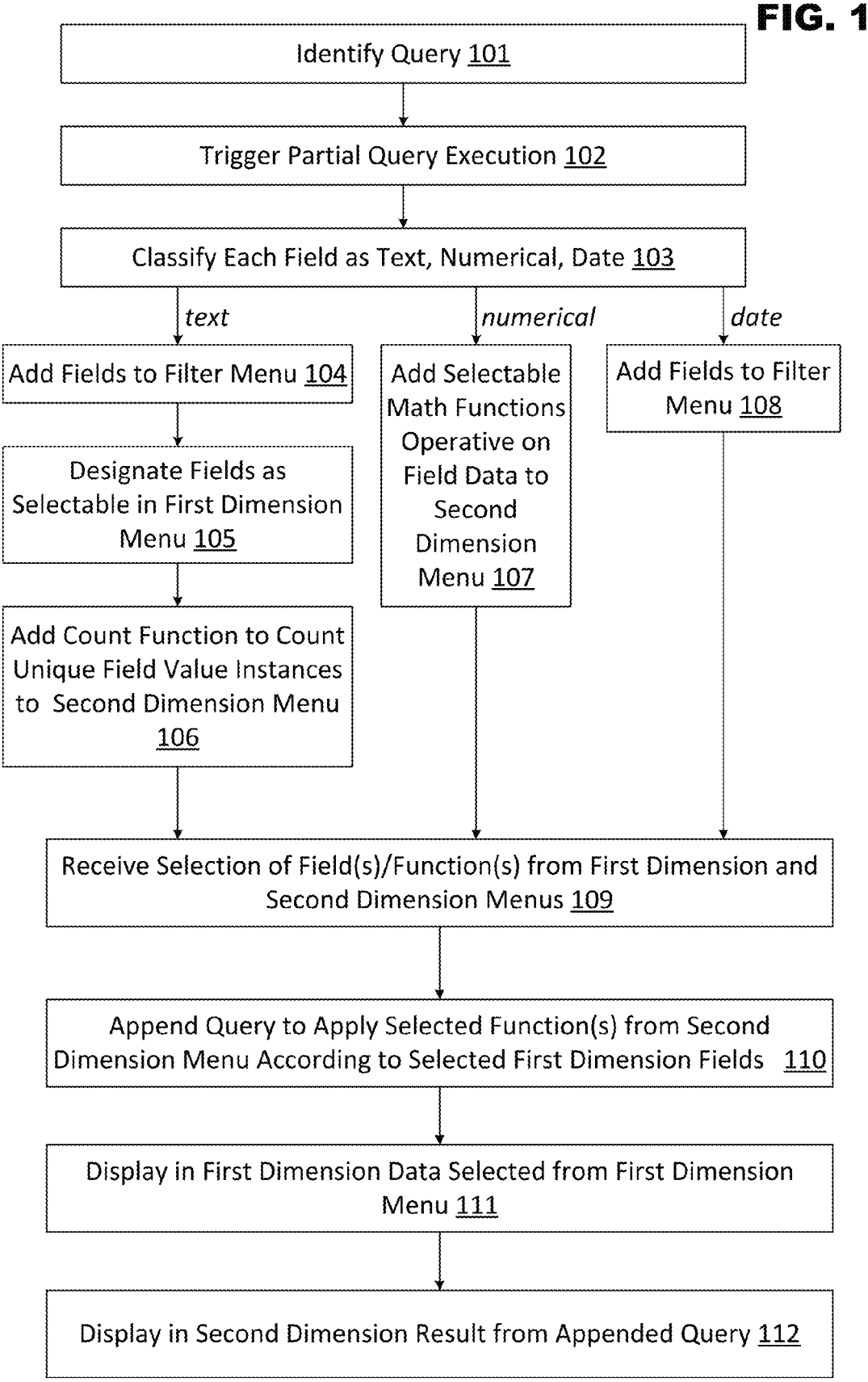
FIG. 1 shows an exemplary process.

FIG. 1 shows an exemplary process. The process may be executed by a processing device. A set of instructions for executing the process may be stored in a computer readable medium. In box 101, a query in the business management system may be identified. The query may be identified using a query, report, or other identifier. The query may also be selected from a list or other source.

In box 102, a partial execution of the identified query may be triggered. The partial execution of the identified query may generate a partial query output of the fields and/or field types included in a result set without actually outputting any data. For example, the identified query may be executed to only generate a list of fields and fields types included in the query output. At this point, the execution of the identified query may cease. The generated list of field types may be used to classify each of the fields. In box 103, each field type may be classified, using a processing device, as one of a text, a numerical, and a date type (or any other data type) based on the type definition provided during the partial execution of the identified query. In instances where the field type includes a number type, including, but not limited to, an integer type, real number type, fixed-point type, or floating-point type, the fields may be classified as numerical.

In instances where the field type includes a date type, those fields that consist of data in a valid date format may be classified as date. Any recognized date format may be used.

In instance where the field type does not consist of either a numerical or date type, the field may be classified as text. Boxes 104, 105, and 106 may apply to those fields classified as text fields. In box 104, each respective field classified as text may be added to a filter menu in the interface. In box 105, each respective field classified as text may also be designated as selectable in a first dimension menu of the interface.

Finally, in box 106, a selectable count function may be added to a second dimension menu for each respective field classified as text. The selectable count function may, if selected, count a number of instances that one or more unique field values occur in a respective field.

Box 107 may apply to those fields classified as numerical fields. In box 107, one or more selectable mathematical functions may be added to the second dimension menu of the interface for each field classified as numerical. Each mathematical function may, if selected, perform an arithmetic, logical, statistical, or other computation on data in each respective field. The mathematical functions may include one or more of a sum function, an average function, a minimum function, and a maximum function for each field designated as numerical. Each of these functions may be independently selectable. The sum function may aggregate the data in its field. The average function may average the data in its field. The minimum function may return a lowest data value in its field. The maximum function may return a high data value in its field.

Box 108 may apply to those field classified as date fields. In box 108, each field classified as date may be added to the filter menu.

Once each field has been classified as one of text, numerical, and date in box 103 and then processed in boxes 104 to 108, each of the menus, including the first dimension menu, the second menu, and the filter menu, may be presented to a user through the interface. The user may then select one or more functions or fields from one or more of the menus.

In some instances, a range of possible data values associated with each field added to the filter menu may be identified. The range of possible data values may be obtained by looking up actual data values in each respective field. The range of possible data values may also be obtained by identifying a restriction of data values associated with respective field. For example, if the respective field is designated as a Yes/No or On/Off field, then the data values may be limited to one of these two possible values. On the other hand, if the actual data values of a field only include fifteen unique values, then the range of possible data values may only include these fifteen possible choices.

Once the range of values has been identified, an option may be provided in the filter menu to enable the user to select at least one value in the identified range of values associated with at least one field added to the filter menu. Once the user make a selection of one or more valued in the identified range and this selection is received, the selected values may be designated as the subset of data from the at least one selected field in the filter menu.

In box 109, a selection of function(s) and/or field(s) made by the user from the first dimension, second dimension, and/or filter menus may be received. This selection may include a selection of at least one of the selectable sum, average, minimum, maximum, and count functions.

In box 110, one or more additional query terms may be appended to the identified query to apply the selected function(s) to the identified query. For example, a received selection of at least one of the functions from the second dimension menu may be applied to the subset of data from the at least one selected field in the filter menu and/or according to the selected field(s) from the first dimension menu.

In box 111, data from one or more fields selected from the first dimension menu may be displayed in a first dimension of the interface. This first dimension may occur along a vertical or horizontal axis of a chart, graph, grid, or other visual representation of the query results in the output display area.

In box 112, a query result from executing the appended query in box 110 may be displayed in a second dimension of the interface. This query result may include an output from applying the selected function(s) to data displayed in the first dimension. The second dimension may also occur along a vertical or horizontal axis of a chart, graph, grid, or other visual representation of the query results in the output display area.

The visual representation of the query results may include displaying data in the first and second dimensions in a graphical format. The graphical format may be switchable between a grid format or any other defined chart format, which may include a bar chart format, a line chart format, a scatter plot format, a pie chart format, a three dimensional chart format, and/or a stacked chart format. If the first dimension is along a vertical axis, then the second dimension may be along the horizontal axis, and vice versa. In some instances, the first dimension may be parallel to a horizontal axis of a graph displayed in the output display area and the second dimension may be parallel to a vertical axis of the graph. In other instances the first and/or second dimensions may be along a radial or axial direction. In other situations, including, but not limited to three dimensional situations, the first or second dimensions may include a direction going into or out of a two-dimensional page. Other directions may also be used in different embodiments.

In some instances, a sorting menu may also be displayed in the interface. The sorting menu may include an ascending sorting option, a descending sorting option, and an option to select at least one field in the first dimension menu that is to be sorted according to either the ascending sorting option or the descending sorting option. A user may then select either one of the ascending or descending sorting options as well as at least a field in the first dimension menu that is to be sorted according to the selected ascending or descending sorting option.

Once the user's selection of the at least one field included in the first dimension menu that is to be sorted and the user's selection of either the ascending sorting option or the descending sorting option is received, an instruction may be appended to the query to sort a query result according to the received selection of the at least one field and the received selection of either the ascending sorting option or the descending sorting option. The appended instruction may then be executed when the query is executed. This may cause the query result to be sorted according to selected sorting options appended to the query.

In some instances, a limiting menu may be displayed in the interface. The limiting menu may limit a number of query results to a top number N of results. The top number N may be selectable by a user. For example, if a user selects the top number N to be 10, then only the top ten query results may be shown in the output display area of the interface.

Once a selection of the top number N has been received, an instruction may be appended to the query so that only the top number N of results are included in an outputted result of the query. In some instances, this top number N may be a user selectable number between 1 and 100.

In some instance, a format menu may be displayed in the interface. The format menu may provide the user with an option to select one of a plurality of data formats for an output. In some instances, the output may be a graph, chart, or other visual representation of the query results shown in the output display area. In other instances, the output may be the query results or other data generated from an outputted result of the query.

Once the user selects one of the data formats and the selection of the one data format is received, the output, including, but not limited to, the graph, grid, chart, or other visual representation, may be generated in the selected data format. Examples of data formats include a .NET format and a HTML5 format. In some instances, the output, including, but not limited to, the graph, chart, or other visual representation, may exported in the selected data format for use by another program.

Figure 2:
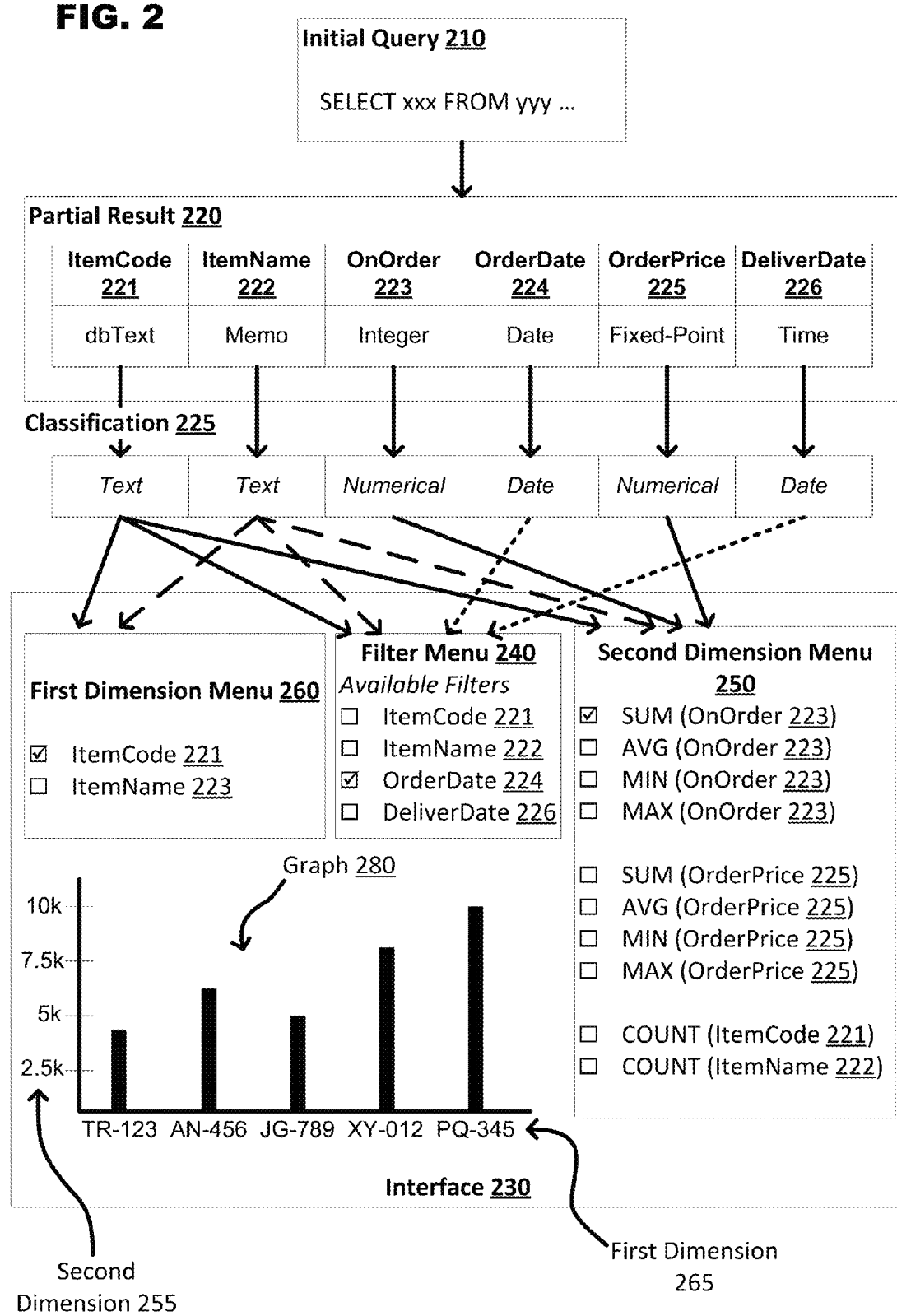
FIG. 2 shows an exemplary execution of a process.

FIG. 2 shows an exemplary execution of a process. In box 210, an initial query may be selected. In this case, the query to be selected is a query in a structured query language (SQL), though in different embodiments different queries types, languages, and structures may also be selected. Once the initial query has been identified, at least a partial execution of the identified query may be triggered to identify the fields and/or field types in the query result.

The fields and field types are shown in box 220. In this example, the fields ItemCode 221, ItemName 222, OnOrder 223, OrderDate 224, OrderPrice 225, and DeliverDate 226 are included in the partial result 220. Also, in this example, only the fields and field types are outputted as the partial result 220.

Once the partial results have been generated, each field 221 to 226 in the first row of the partial result may be classified 225 as one of text, numerical, and date according to its respective field type. Since only the OnOrder 223 and OrderPrice 225 fields contain data consisting of number types, in this case Integer type in OnOrder field 223 and fixed-point type in OrderPrice field 225, only these fields 223 and 225 may be classified as numerical. Since only the OrderDate 224 and DeliverDate 226 fields contain data in a recognized date format, in this case the date and/or time database field types, only these fields 224 and 226 may be classified as dates. Since the remaining fields ItemCode 221 and ItemName 222 do not satisfy the criteria for being classified as numerical or date, these fields 221 and 222 may be classified as text.

Once each of the fields 221 to 226 in the partial results have been classified, the generation of the user interface 230 may then start. The user interface 230 may include three menus containing one or more user selectable options. The three menus include a first dimension menu 260, a second dimension menu 250, and a filter menu 240. Once the user selects one or more options from the first dimension menu 260 and the second dimension menu 250, a chart, graph 280, or other visual representation of result of a full query execution subject to the options selected from each of the three menus 240, 250, and 260.

The options that are shown in each of three menus 240, 250, and 260 may vary depending on how each of the query result fields 221 to 226 have been classified. For those fields classified as text: (i) each respective field may be added to the filter menu 240 in the interface, (ii) each respective field may be designated as selectable in the first dimension menu 260 of the interface, and (iii) a selectable count function for each respective field may be added to the second dimension menu 250 of the interface. The count function may count a number of instances of a unique field value. Thus, as shown in FIG. 2, the text fields ItemCode 221 and Item 222 have been added to the first dimension menu 260 and filter menus 240 of the interface 230. Additionally, a COUNT function for counting a number of instances of a unique field value in each of the ItemCode 221 and ItemName 222 fields has also been added to the second dimension menu 250.

For those fields 223 and 225 classified as numerical, a selectable mathematical function operative on data in each respective field may be added to the second dimension menu 250 of the interface 230. In the example shown in FIG. 2, a sum, average, minimum, and maximum selectable functions have been added to the second dimension menu 250 for each of the OnOrder 223 and OrderPrice 225 fields that have been classified as numerical.

For those fields classified as date, each respective field may be added to the filter menu 240. In the example shown in FIG. 2, the OrderDate 224 and DeliverDate 226 fields, which are the only fields classified as date, have been added to the filter menu 240 shown in the interface.

Once the respective menus 240, 250, and 260 have been created, a user may select one or more options from each of the menus 240, 250, and 260. In the example shown in FIG. 2, the user has selected the ItemCode field 221 in the first dimension menu 260, the OrderDate field 224 in the filter menu 240, and the Sum function for the OnOrder field 223 in the second dimension menu 250 for adding all of the data in the OnOrder field 223. In addition to selecting the OrderDate field 224 in the filter menu, the user may also select a further criterion, value, or range of values (not shown) for further limiting the returned query results to the selected criterion, value, or range of values. Thus, in the example of FIG. 2, if the user selected to limit the OrderDate field 224 to only those results having a date in the OrderDate field 224 that is within the past year (not shown), the results of query shown in the chart, graph 280, or other visual representation of results may be limited to those results with an OrderDate field 224 date within the past year.

Once the user's selection is received, the identified query may be appended to apply the at least one selected function in the second dimension menu 250 (in this case the SUM function to add the data in the OnOrder field 223) according to the field(s) selected from the first dimension menu.

Once the full results of the query have been generated, the chart, grid, graph 280, or other visual representation of results may be displayed. In the example shown in FIG. 2, the visual representation is a graph 280 having a first dimension 265 corresponding to a horizontal axis and a second dimension 255 corresponding to a vertical axis. Since the ItemCode field 221 was selected from the first dimension menu, each of the item codes included in the ItemCode field 221 of the query results may be displayed along the horizontal axis. In this case, the item code includes the item codes TR-123, AN-456, JG-789, XY-012, and PQ-345. Thus, data from the field(s) selected from the first dimension menu 260 may be displayed in the first dimension 265 of the visual representation 280 included in the interface 230.

Since the SUM function for the OnOrder field 223 was selected in the second dimension menu, the results of adding all of the OnOrder 223 field data for each unique ItemCode 221 field having an OrderDate 223 date within the past year may be displayed along the vertical dimension 225 for each of the unique ItemCodes 221. Thus, a result of applying the selected function(s) from the second dimension menu 250 in the appended query to the field data displayed in the first dimension 265 may be displayed in the second dimension 255 of the visual representation 280 included in the interface 230.

Figure 3:
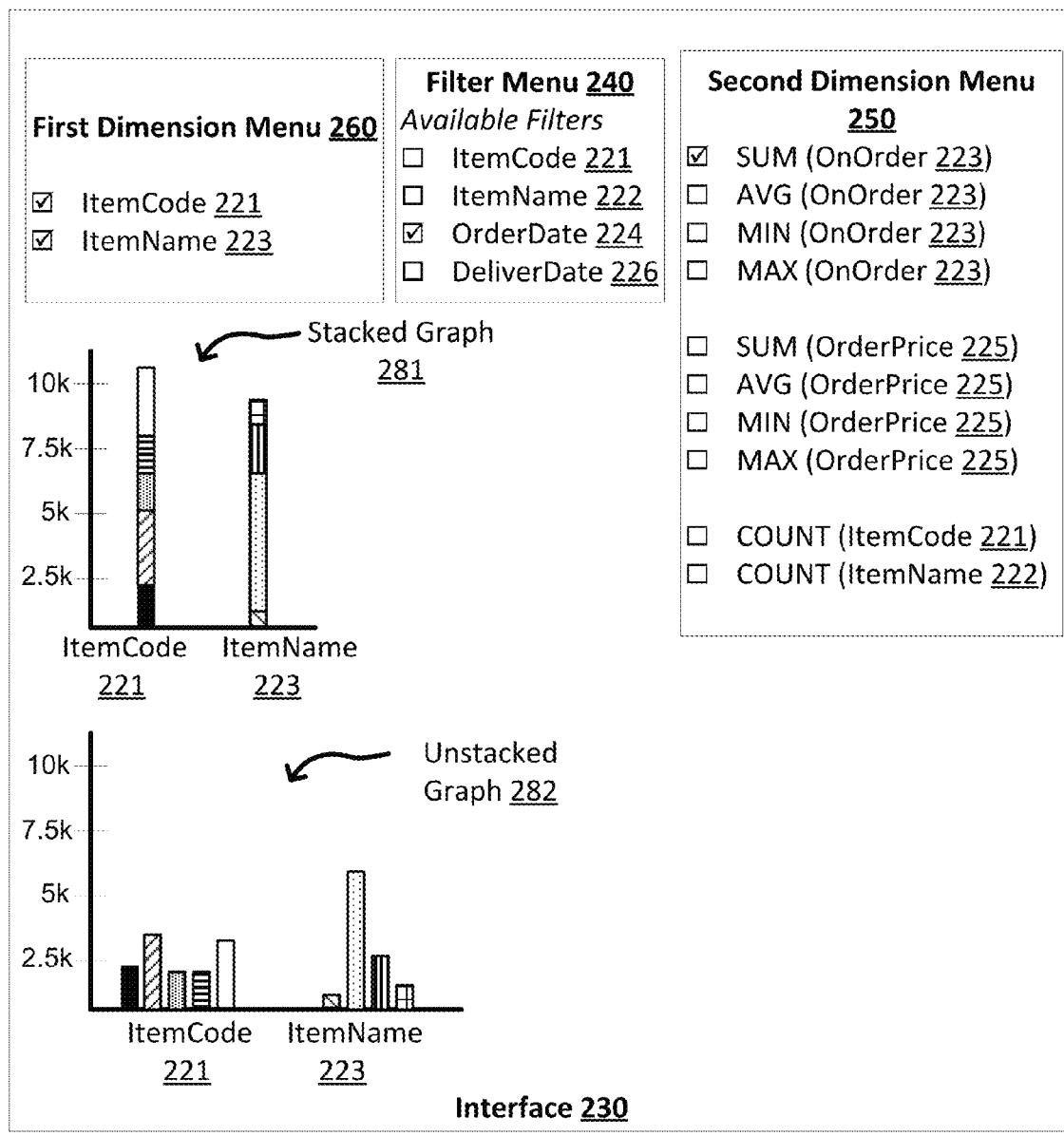
FIG. 3 shows an alternate exemplary interface.

FIG. 3 shows an alternative view of an exemplary interface 230 if a user selects more than one field in the first dimension menu 260. In this example, a user has selected both the ItemCode 221 and ItemName 223 fields in the first dimension menu 260. In this case, the interface may show the results of the selected functions from the second dimension menu 250 as applied to each of the selected fields in the first dimension menu 260. In this example, the results are shown in both a stacked chart graph 281 and unstacked chart graph 282. In some instances, the interface 230 may include an option to toggle between the stacked view 281 and the unstacked view 282. Although this example shows only two fields being selected in the first dimension menu, in other instances a different number of fields greater than or less than that shown may be selected.

Figure 4:
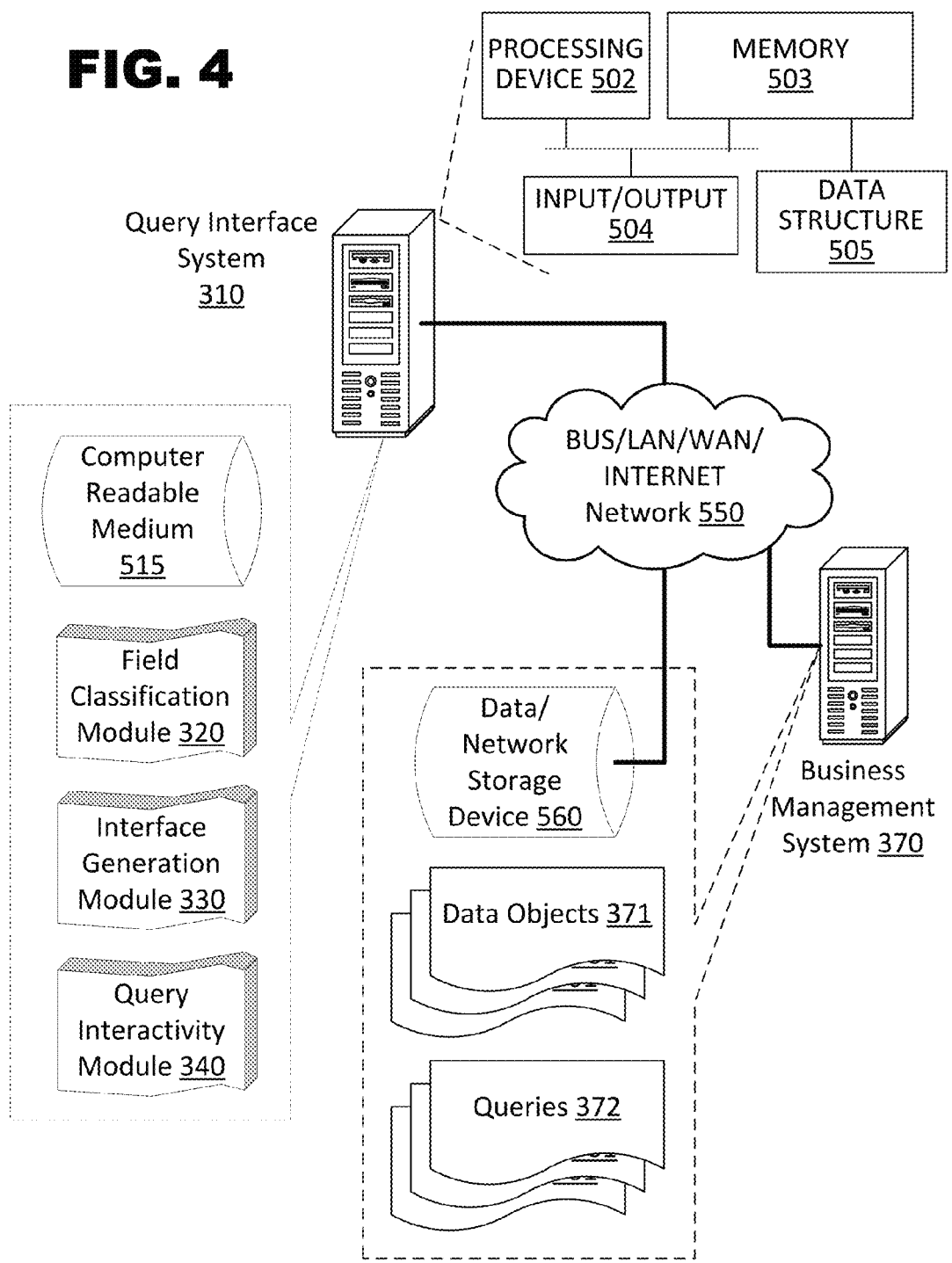
FIG. 4 shows an exemplary architecture.

FIG. 4 shows an exemplary architecture. Query interface system 310 may include a computer readable medium 515 storing application modules that may include a field classification module 320, interface generation module 330, and a query interactivity module 340. In some instances, these modules 320, 330, 340, and/or other modules or components of the query interface system 310 may be stored in a memory 503 or data structure 505 that is separate from the computer readable medium 515 and/or the query interface system 310.

The query interactivity module 340 may include functionality for identifying a query in the business management system, triggering at least a partial execution of the identified query to identify a field type of each field in a query result, and appending the identified query, all of which may occur through the communications device, which may include hardware enabling connectivity with the business management system.

The field classification module 330 may include functionality for classifying each field in the first row of the query result as one of text, numerical, and date based on its respective field type.

The interface generation module 320 may include functionality, for those fields classified as text, for adding each respective field to a filter menu in a user interface, designating each respective field as selectable in a first dimension menu of the user interface, and adding a selectable count function for each respective field to a second dimension menu of the user interface. The count function may count a number of instances of a unique field value.

The interface generation module 320 may also include functionality, for those fields classified as numerical, for adding a selectable mathematical function operative on data in each respective field to the second dimension menu of the interface. The interface generation module 320 may also include functionality, for those fields classified as date, for adding each respective field to the filter menu.

The interface generation module 320 may also include functionality for receiving a selection of at least one field in the first dimension menu and at least one function in the second dimension menu; displaying in a first dimension of the user interface data from the at least one selected field from the first dimension menu; and displaying in a second dimension of the user interface a result of applying a selected function in the appended query to data displayed in the first dimension. The modifying of the identified query may also include applying at least one selected function added in the second dimension menu according to the at least one selected field in the first dimension menu.

Query interface system 310 may be connected to a network 550. Network 550 may include a LAN, WAN, bus, or the Internet. Query interface system 310 may interface with other systems and components depending on the application. For example, a network/data storage device 560 may be used to store the different types of data structures, including business management system data and/or data object 371, as well as queries 372 to be executed on the business management system data and/or data objects 371. The storage device 560 may be a part of a business management system 370.

In some embodiments the network storage device 560 may also be separate from the business management system 370 but connected to it through network 550. The storage device 560 may contain a hard disk drive, flash memory, or other computer readable media capable of storing data. Other external systems and data sources may also be connected to network 550. These other systems may be used to supply additional data or information used by the query interface system 310 or business management system 370, such as, for example, financial, customer, or other organizational data.

Each of the systems, clients, and devices in FIG. 4 may contain a processing device 502, memory 503 storing loaded data or a loaded data structure 505, and a communications device 504, all of which may be interconnected via a system bus. In various embodiments, each of the systems 310 and 370 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Communications device 504 may enable connectivity between the processing devices 502 in each of the systems 310 and 370 and the network 550 by encoding data to be sent from the processing device 502 to another system over the network 550 and decoding data received from another system over the network 550 for the processing device 502.

In an embodiment, memory 503 may contain different components for retrieving, presenting, changing, and saving data and may include the computer readable medium 515. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, although the data access system 510 is shown as a separate system from the data object storage system 570, in some instances the data object storage system 570 and the data access system 510 may be functionally integrated into a single system.

We claim:

1. A method for generating an interface for modifying a query output comprising:
    identifying a query;
    triggering a partial execution of the identified query to identify a field type of each field in a query result;
    classifying, using a processing device, each field in the query result as one of text, numerical, and date according to its respective field type;
    for those fields classified as text:
        adding each respective field to a filter menu in the interface;
        designating each respective field as selectable in a first dimension menu of the interface; and
        adding a selectable count function for each respective field to a second dimension menu of the interface, wherein the count function counts a number of instances of a unique field value;
    for those fields classified as numerical, adding a selectable mathematical function operative on data in each respective field to the second dimension menu of the interface;
    for those fields classified as date, adding each respective field to the filter menu;

receiving a selection of at least one field in the first dimension menu and at least one function in the second dimension menu;

appending, using the processing device, the identified query to apply the at least one selected function added in the second dimension menu according to the at least one selected field in the first dimension menu;

displaying in a first dimension of the interface data from the at least one selected field from the first dimension menu; and displaying in a second dimension of the interface a result of applying the selected function in the appended query to data displayed in the first dimension.

2. The method of claim 1, wherein a field in the first row of the query result is classified as numerical if it consists of a real number.

3. The method of claim 1, wherein a field in the first row of the query result is classified as date if it consists of data in a valid date format.

4. The method of claim 1, further comprising:
receiving a selection of at least one field in the filter menu and a subset of data in the at least one field in the filter menu; and
appending the identified query to apply the at least one selected function added in the second dimension menu to the received subset of data in the received at least one field in the filter menu.

5. The method of claim 1, wherein a field in the first row of the query result is classified as text if it does not consist entirely of either a real number or data in a valid date format.

6. The method of claim 1, wherein the first dimension is parallel to a horizontal axis of a graph and the second dimension is parallel to a vertical axis of the graph.

7. The method of claim 1, further comprising:
identifying a range of values associated with each field added to the filter menu;
providing an option in the filter menu to select at least one value in the range of values associated with at least one field added to the filter menu; and
designating a selection of at least one value in the range of values as the subset of data from the at least one selected field in the filter menu.

8. The method of claim 7, further comprising, for those fields classified as numerical, adding a selectable sum function, a selectable average function, a selectable minimum function, and a selectable maximum function, wherein the sum function aggregates the data in its respective field, the average function averages the data in its respective field, the minimum function returns a lowest data value in its respective field, and the maximum function returns a highest data value in its respective field.

9. The method of claim 8, further comprising:
receiving a selection of at least one of the selectable sum, average, minimum, maximum, and count functions; and
applying the received selection of at least one of the functions to the subset of data from the at least one selected field in the filter menu.

10. The method of claim 1, further comprising:
displaying a sorting menu in the interface that includes an ascending sorting option, a descending sorting option, and an option to select at least one field in the first dimension menu that is to be sorted according to either the ascending sorting option or the descending sorting option;

receiving a selection of the at least one field included in the first dimension menu that is to be sorted and a selection of either the ascending sorting option or the descending sorting option; and appending an instruction to the query to sort a query result according to the received selection of the at least one field and the received selection of either the ascending sorting option or the descending sorting option.

11. The method of claim 10, further comprising sorting the query result according to the appended instruction to the query.

12. The method of claim 1, further comprising:
displaying a limiting menu in the interface to limit a number of query results to a top number N of results, wherein the top number N is selectable by a user;
receiving a selection of the top number N; and
appending an instruction to the query to include only the top number N of results in an outputted result of the query.

13. The method of claim 1, further comprising:
receiving a selection of more than one field in the first dimension menu;
displaying an option to select between a stacked chart format and an unstacked chart format;
receiving a selection of the displayed option; and
displaying in the first dimension of the interface data from each selected field from the first dimension menu in the selected chart format.

14. The method of claim 1, further comprising:
displaying a format menu in the interface to select one of a plurality of formats for a graph generated from an outputted result of the query;
receiving a selection of the one format; and
generating the graph in the selected format.

15. The method of claim 14, wherein the plurality of formats include a .NET format and a HTML5 format.

16. The method of claim 14, further comprising exporting the graph in the selected format.

17. The method of claim 1, wherein the data displayed in the first and the second dimensions are displayed in a graphical format.

18. The method of claim 17, wherein the graphical format is switchable between a grid format and a chart format.

19. A non-transitory computer readable medium comprising a set of stored instructions that, when executed by a processing device, cause the processing device to:
identify a query;
trigger a partial execution of the identified query to identify a field type of each field in a query result;
classify each field in the query result as one of text, numerical, and date based on its respective field type;
for those fields classified as text:
add each respective field to a filter menu in the interface;
designate each respective field as selectable in a first dimension menu of the interface; and
add a selectable count function for each respective field to a second dimension menu, wherein the count function counts a number of instances of a unique field value;
for those fields classified as numerical, add a selectable mathematical function operative on data in each respective field to the second dimension menu of the interface;
for those fields classified as date, add each respective field to the filter menu;
receive a selection of at least one field in the first dimension menu and at least one function in the second dimension menu;

append the identified query to apply the at least one selected function added in the second dimension menu according to the at least one selected field in the first dimension menu;

display in a first dimension of the interface data from the at least one selected field from the first dimension menu; and display in a second dimension of the interface a result of applying the selected function in the appended query to data displayed in the first dimension.

20. A query interface system comprising:

a communications hardware device for enabling connectivity with a business management system through a network;

a query interactivity module for (i) identifying a query in the business management system, (ii) triggering at least a partial execution of the identified query to identify a field type of each field in a query result, and (iii) append the identified query, through the communications module;

a field classification module for classifying each field in the first row of the query result as one of text, numerical, and date based on its respective field type; and an interface generation module for:
  (i) for those fields classified as text:
    adding each respective field to a filter menu in a user interface;
    designating each respective field as selectable in a first dimension menu of the user interface; and
    adding a selectable count function for each respective field to a second dimension menu of the user interface, wherein the count function counts a number of instances of a unique field value;
  (ii) for those fields classified as numerical, adding a selectable mathematical function operative on data in each respective field to the second dimension menu of the interface;
  (iii) for those fields classified as date, adding each respective field to the filter menu;
  (iv) receiving a selection of at least one field in the first dimension menu and at least one function in the second dimension menu;
  (v) displaying in a first dimension of the user interface data from the at least one selected field from the first dimension menu; and
  (iv) displaying in a second dimension of the user interface a result of applying a selected function in the appended query to data displayed in the first dimension;

wherein the appending of the identified query includes applying at least one selected function added in the second dimension menu according to the at least one selected field in the first dimension menu.

* * * * *